United States Patent [19]

Kato et al.

[11] 4,317,179
[45] Feb. 23, 1982

[54] METHOD AND APPARATUS FOR PROCESSING A RADIOGRAPHIC IMAGE

[75] Inventors: Hisatoyc Kato; Masamitsu Ishida; Seiji Matsumoto, all of Minami-ashigara, Japan

[73] Assignee: Fuji Photo Film Co., Ltd., Tokyo, Japan

[21] Appl. No.: 106,734

[22] Filed: Dec. 26, 1979

[30] Foreign Application Priority Data

Dec. 26, 1978 [JP] Japan .................. 53-163575
Jul. 11, 1979 [JP] Japan ................... 54-87794
Nov. 22, 1979 [JP] Japan .................. 54-151395
Nov. 22, 1979 [JP] Japan .................. 54-151397
Nov. 22, 1979 [JP] Japan .................. 54-151399
Nov. 22, 1979 [JP] Japan .................. 54-151401

[51] Int. Cl.$^3$ ................................................ H04N 1/40
[52] U.S. Cl. .................... 364/515; 250/363 R; 358/284; 364/414
[58] Field of Search .......... 364/414, 415, 515, 518; 250/330, 337, 445 R, 445 T, 362, 363 R; 358/96, 111, 166

[56] References Cited

U.S. PATENT DOCUMENTS

| 3,006,238 | 10/1961 | Eberline | 358/96 |
| 3,696,249 | 10/1972 | Bowker | 358/96 |
| 3,859,527 | 1/1975 | Luckey | 250/337 |
| 3,927,323 | 12/1975 | Koloc | 250/330 |
| 3,936,598 | 2/1976 | Newitt | 358/96 |
| 3,975,637 | 8/1976 | Ikedo et al. | 250/337 |
| 4,196,453 | 4/1980 | Warren | 364/515 |

*Primary Examiner*—Errol A. Krass
*Attorney, Agent, or Firm*—Gerald J. Ferguson, Jr.; Joseph J. Baker

[57] ABSTRACT

A method of and apparatus for processing a radiographic image in a radiographic image copying system in which an original radiograph scanned with the light beam and the image information of the radiograph is read out by a detector which gives an output to be processed and used for reproducing an image on a recording material. In the processing of the detected output, an operation represented by a formula $$D' = \text{Dorg} + \beta(\text{Dorg} - \text{Dus})$$

is conducted, where Dorg is the original image density detected by the detector, $\beta$ is an emphasis coefficient, and Dus is an unsharp mask density corresponding to a super-low spatial frequency at every scanning point. The unsharp masking process may be performed together with a gradation process, reduction of image size, smoothing process and the like. Further, the emphasis coefficient may be varied with either the original image density Dorg or the unsharp mask signal Dus.

16 Claims, 34 Drawing Figures $\beta$ = Const     $\beta' \gtreqless 0$     $\beta' \lesseqgtr 0$     $\beta' \lesseqgtr 0$

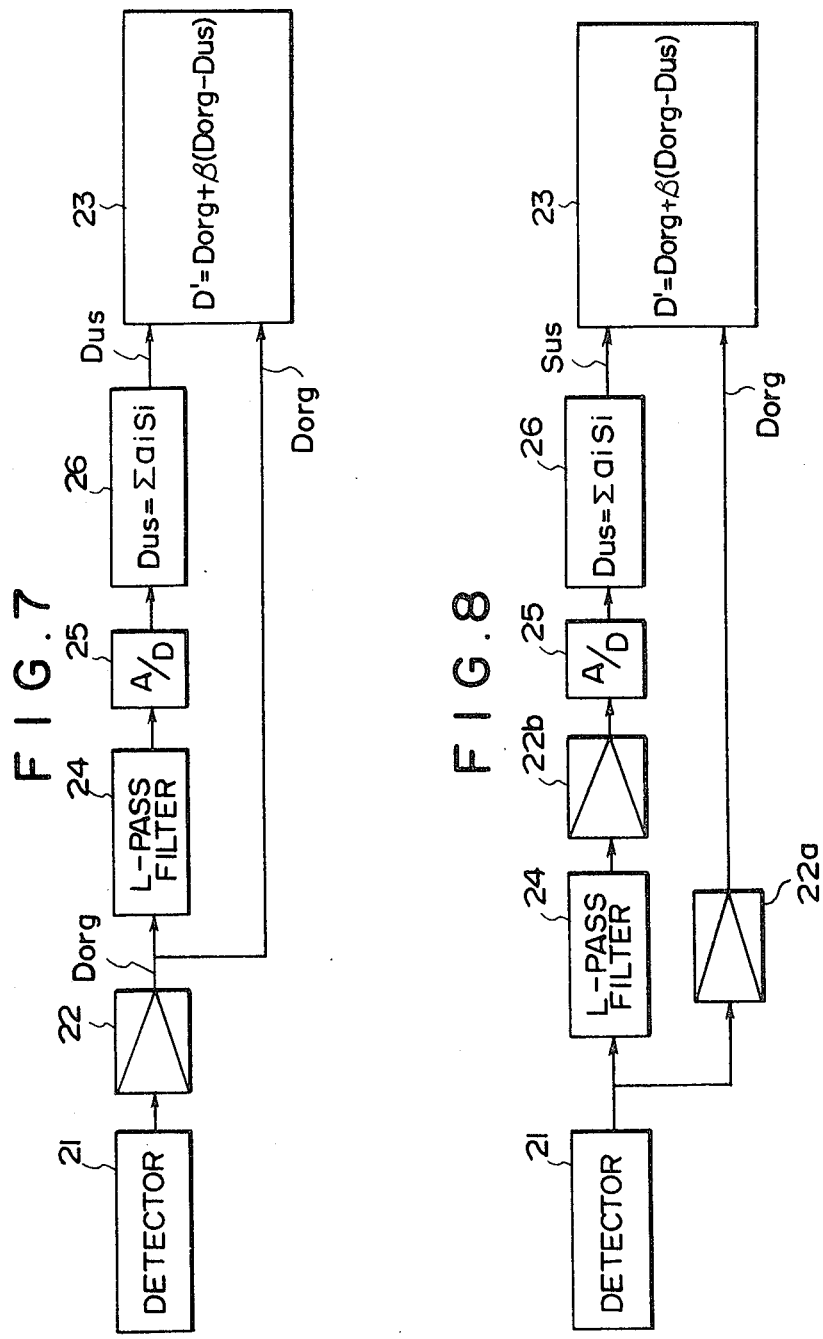

FIG.14
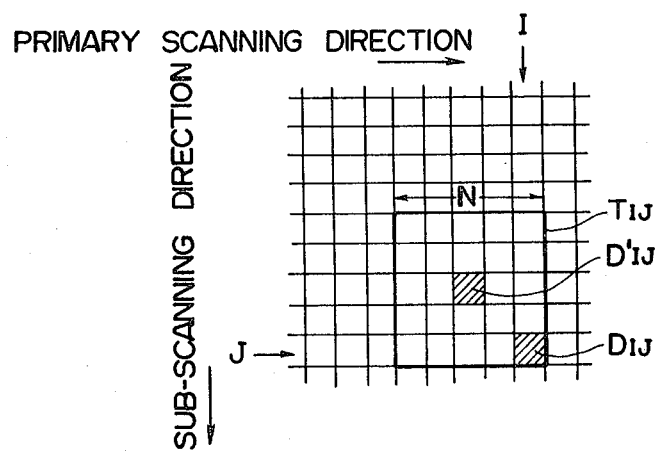
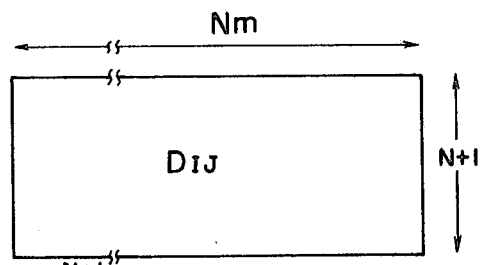
FIG.15A
FIG.15B
FIG.15C
FIG.15D
FIG.16
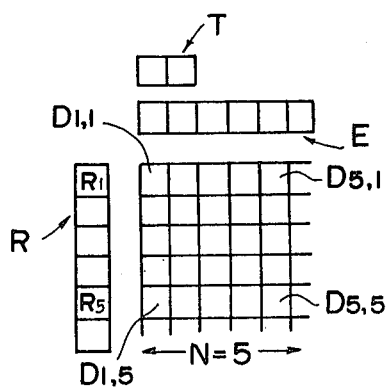

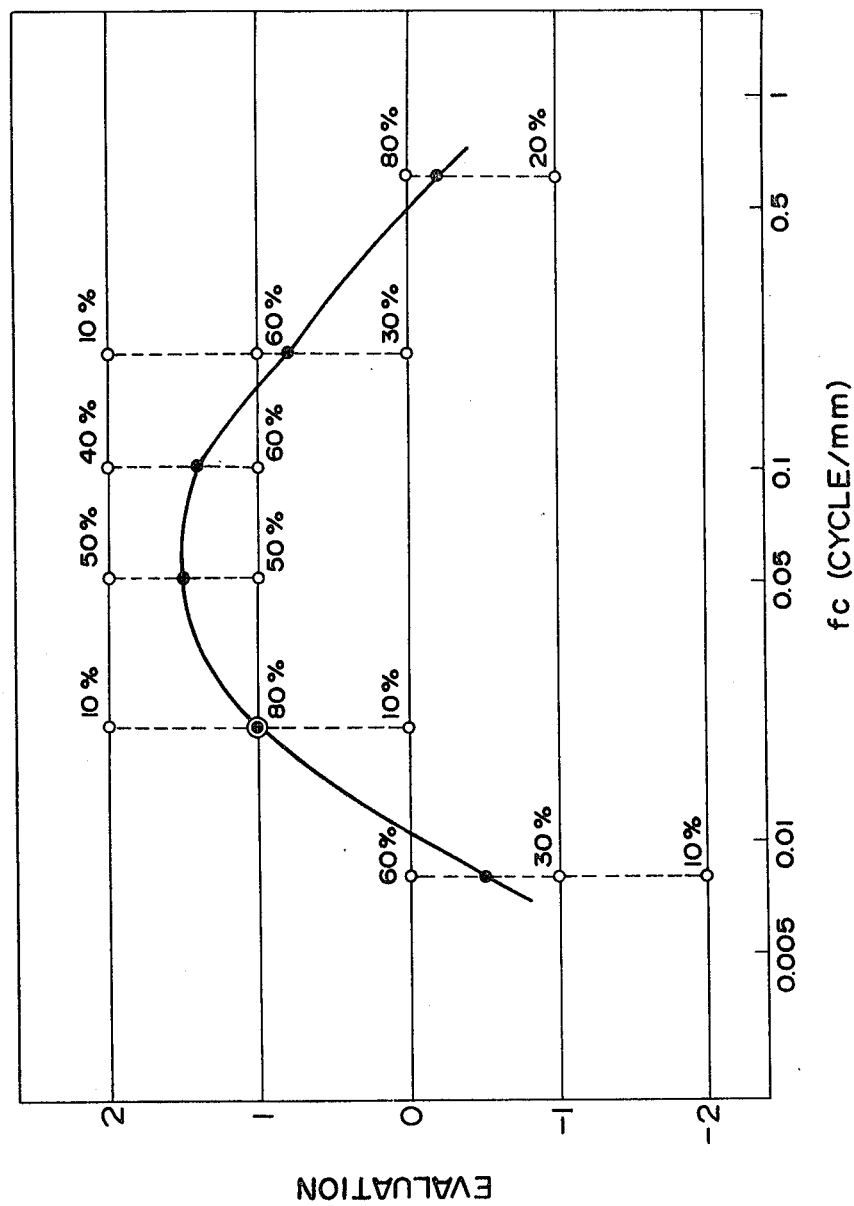

METHOD AND APPARATUS FOR PROCESSING A RADIOGRAPHIC IMAGE

BACKGROUND OF THE INVENTION

1. Field of the Invention

This invention relates to a method of processing a radiographic image used for medical diagnosis and an apparatus therefor, and more particularly to a method of and apparatus for processing a radiographic image when the radiographic image once recorded on a radiographic film is copied on a recording medium. The image processing method and apparatus of this invention performs an unsharp masking process on the radiographic image to enhance the diagnostic efficiency and accuracy of the radiographic image.

The radiographic image referred to in this application means an original X-ray image recorded on an X-ray film by the conventional radiographic method. The present invention is applied to the radiographic image copying system in which the radiographic image is once converted to an electric signal and the electric signal is used for reproducing the radiographic image on a final recording medium like an ordinary photographic film. When the electrical signal is used for reproducing the radiographic image, the electric signal is processed to obtain an improved image having high diagnostic efficiency and accuracy.

2. Description of the Prior Art

Since X-rays do harm to the human body, it is impossible from the viewpoint of safety to expose the human body to X-rays of high dose. Therefore, it is desirable that the necessary information in the radiography can be obtained by exposing the human body only once to the X-ray of comparatively low dose. On the other hand, radiographs should preferably have both a wide exposure latitude and high image quality of high contrast, high sharpness, low noise etc. for viewing and diagnosis. Unfortunately, since the conventional radiography is designed to satisfy all the required conditions to some extent, the range of recording density or the ability to record various levels of information and the image quality are both insufficient and neither of these properties are completely satisfied.

In view of the above defects in the conventional radiography, some of the inventors of the present invention have proposed a radiographic image processing method in which the radiographic image is read out by an electronic image read-out device to convert the radiographic image into an electric signal and the electric signal is processed to enhance the diagnostic efficiency and accuracy of the image when the image is reproduced on a recording medium like a photographic film by improving the sharpness and the granularity of the image, as disclosed in Japanese Patent Application No. 53(1978)-28533. This method remarkably improve the diagnostic efficiency and accuracy as compared with the conventional radiography. The details of the method of processing the image, however, were not sufficiently clarified in the above application. On the other hand, with respect to the image quality, it is generally known in the art that the image properties can be changed by processing the image by use of an electronic signal or information processing method. For instance, even in radiography, it is possible to read the image recorded on the X-ray film by an optical scanning means and process the read out signal by a signal processing means to change the various image properties such as contrast and the density level and then record a visible image on a recording film or the like based on the processed signal.

In the radiography, however, the recorded image is used for the purpose of "diagnosis" and the diagnostic efficiency and accuracy (the level of easiness for diagnosis or adaptability to diagnosis) are not simply enhanced by simply making so-called "good" image from the point of the ordinary image quality factors such as sharpness, granularity and contrast. Rather than these factors, the diagnosis efficiency and accuracy are influenced by other complex factors such as reference with the normal pattern, reference with the anatomical structure and utilization of other diagnostic view or records.

SUMMARY OF THE INVENTION

The primary object of the present invention is to provide a method of and apparatus for processing a radiographic image in a radiographic image copying system in which both the ability of wide exposure latitute and the high image quality are satisfied.

Another object of the present invention is to provide a method of and apparatus for processing a radiographic image in a radiographic image copying system which is capable of obtaining a radiographic image having high diagnostic efficiency and accuracy.

Still another object of the present invention is to provide a method of and apparatus for processing a radiographic image in a radiographic image copying system which is capable of providing a radiographic image having high diagnostic efficiency and accuracy at a high speed and at a low cost.

Other objects of the present invention will be made apparent from the following description of the invention.

The inventors of the present invention have found through research and investigations that the spatial frequency components of the radiographic image of a human body which is important for diagnosis are in a region of very low frequencies (which will hereinbelow be referred to as "super-low frequency") though there is a little difference in the most important frequency between the portions of the human body to be diagnosed. Further, it has also been discovered that the emphasis of the high frequency components does not improve the diagnostic efficiency and accuracy but emphasizes the noise components and lowers the diagnostic efficiency and accuracy, and on the other hand the reduction of the emphasis of the high frequency components reduces the noise and provides a legible image from a viewpoint of diagnosis. The present invention is based on the above discoveries.

The method of processing a radiographic image in accordance with the present invention is characterized in that, in the course of scanning an original radiograph, reading out the radiographic image information recorded thereon, converting the read out information into an electric signal and reproducing the image on a recording medium using the electric signal, an unsharp mask density Dus corresponding to the super-low frequency is obtained for each scanning point and a signal conversion represented by a formula $$D' = D_{org} + \beta(D_{org} - D_{us}) \qquad (1)$$

where Dorg is an original image density of the original radiograph and $\beta$ is an emphasis coefficient is performed to emphasize the frequency component above the super-low frequency.

In the present invention, more than one unsharp masks can be used so long as the signal conversion is performed according to the above formula. For instance, when two unsharp masks of the different size are used, the formula can be represented as follows.

$$D' = Dorg + \beta(Dorg - Dus1) + \alpha(Dorg - Dus2)$$

This formula, however, can be rewritten into the form of $$D' = Dorg + (\beta + \alpha)[Dorg - \frac{1}{\beta + \alpha}(\beta Dus1 + \alpha Dus2)].$$

This rewritten formula means that the above operation using the two unsharp masks can be regarded as equivalent to the aforesaid basic operation using only one unsharp mask. When the size of the unsharp mask Dus2 is smaller than the unsharp mask Dus1 and the emphasis coefficient $\alpha$ is positive, the graph showing the modulation transfer function has a shape which has an additional peak in the higher frequency component in the range of emphasized frequency. When the emphasis coefficient $\alpha$ is negative, the graph has a shape which has a stepped lowered portion in the higher frequency component in the range of emphasized frequency. The former is suitable for reproducing an image of bones, blood vessels (angiography) and stomack (double contrast), and the latter is suitable for recording an image of the chest tomography, cholecystography, liver, abdomen and head.

Further, the process in accordance with the present invention includes any process in which the results of the operation of signal conversion are the same as those of the operation as mentioned above formula (1), and there is no limit or no restriction with respect to the order of operation.

The unsharp mask density Dus referred to in this invention means a density representing every scanning point which is made by blurring the original image density to contain only the frequency component lower than the super-low frequency. In other words, the unsharp mask density Dus is a density representing an unsharp image obtained by blurring the original image to such an extent that the unsharp mask density contains only the super-low frequency. In the unsharp mask corresponding to the unsharp image, the modulation transfer function is not less than 0.5 at the spatial frequency of 0.01 cycle/mm and not more than 0.5 at the spatial frequency of 0.5 cycle/mm. Further, in order to enhance the diagnostic efficiency and accuracy remarkably, it is desired to use an unsharp mask in which the modulation transfer function is not less than 0.5 at the spatial frequency of 0.02 cycle/mm and not more than 0.5 at the spatial frequency of 0.15 cycle/mm.

In other words, the unsharp mask to be used in the present invention can be defined as the one in which the spatial frequency fc at which the modulation transfer function becomes 0.5 is within the range of 0.01 to 0.5 cycle/mm, and preferably within the range of 0.02 to 0.15 cycle/mm.

In this invention, the emphasis coefficient $\beta$ may be fixed or changed as a function of the original image density (Dorg) or the unsharp mask density (Dus). By changing the emphasis coefficient as a function of the original image density (Dorg) or the unsharp mask density (Dus), the diagnostic efficiency and accuracy are further improved.

Further, by selecting the emphasis coefficient $\beta$ and the unsharp mask density (Dus), the ratio of the maximum value (B) of the modulation transfer function of the system providing the reproduced image on the final recording medium based on the emphasized signals to the limit value (A) of the modulation transfer function which is a limit value where the spatial frequency is infinitely close to zero, i.e. B/A can be changed. Under the condition of B/A<1.5, the diagnostic efficiency and accuracy is not much improved as compared with the original radiograph. When the emphasis coefficient $\beta$ is fixed, the ratio B/A should not be over 6 since if the ratio is over 6 the image becomes partially unnatural due to over-emphasis and for example, the area whose density is saturated either to white (fog level of the recording medium) or to black (maximum density of the recording medium) appears in the image. On the other hand, when the emphasis coefficient $\beta$ is changed according to the original image density Dorg or the unsharp mask density Dus, the desirable range of the ratio B/A is enlarged and may be larger than 6 if not more than 10. In this case, the maximum value of the ratio B/A is regarded as the value B/A since the ratio B/A itself changes as the value Dorg or Dus changes. Thus, it is necessary that the ratio B/A should be 1.5 to 6 when the emphasis coefficient $\beta$ is fixed and 1.5 to 10 when it is changed with Dorg or Dus. Further, it has also been found that the diagnostic efficiency and accuracy are remarkably improved when the ratio B/A is selected within the range of 2 to 5.5 and 2 to 8 in the respective cases.

The emphasis coefficient $\beta$ is selected so that the ratio B/A becomes within said desirable range. The ratio B/A, however, somewhat changes also with the shape of the unsharp mask or the unsharp mask density Dus. Therefore, the value of $\beta$ cannot be readily determined unless the shape of the unshape mask, that is, the density Dus is determined.

The unsharp mask can be obtained by the following methods for example.

(1) When the image signal is read out, the diameter of the read-out light beam spot is changed to average the density at the measuring point together with the densities around the measuring point. In order to effect this, the diameter of the light beam spot may be directly changed or an optical masking may be made by use of an aperture or the like.

(2) The original image signal at every scanning point is memorized and the memorized original image signals are read out together with the surrounding signals according to the size of the unsharp mask to obtain a mean value as the unsharp mask density Dus. (The mean value is obtained as an simple arithmetical mean or various kinds of weighted mean.) In this method, the unsharp mask is made in the form of analog signals or in the form of degital signals after A/D conversion. Further, it is also possible to make the unsharp mask by transmitting the analog signal through a low pass filter in the primary scanning direction and processing the signal in the digital form in the sub-scanning direction.

Among the above methods, the second method is the most preferable from the viewpoint of ability of giving flexibility to the image processing.

In order to carry out the second method, the following operation of the arithmetic mean is conducted for every scanning point to obtain the unsharp mask density Dus.

$$Dus = \sum_{i,j \in 0} \alpha_{ij} Dorg(i,j) \qquad (2)$$

where i and j are coordinates of the circular area having the scanning point at the center thereof and $\alpha_{ij}$ is a weighting coefficient which should preferably have a smooth variation in all the radial directions isotropically and satisfies the formula $$\sum_{i,j \in 0} \alpha_{ij} = 1.$$

Said circular area includes N number of picture elements in the direction of the diameter thereof.

However, in order to simply carry out the above operation, it is necessary to conduct the $\pi/4N^2$ times of multiplications and $\pi/4N^2$ times of additions. Therefore, when N is a large number it takes a very long time to conduct the operation, which is impractical. Since it is necessary to scan the original radiograph with a sampling rate of 5 to 20 pixel/mm (50 to 200μ in terms of the size of the picture element) in order to preserve the necessary frequency components of the image, the number of the picture elements (N) included in the unsharp mask corresponding to the super-low frequency is inevitably large and accordingly it takes a very long time to conduct the above operation. For instance, in case of using an unsharp mask having a weighting coefficient having a Gaussian distribution, N becomes about 50 when the size of the picture element is 100μ×100μ and fc=0.1 cycle/mm and about 250 if fc=0.02 cycle/mm. This means that the time for conducting the above operation will be considerably long.

Further, in order to obtain the arithmetic mean for the circular area, the range in which the addition is to be conducted should be changed for every scanning line, which makes the operating mechanism very complex and costly.

Therefore, it is desirable to simplify the operation to reduce the time for conducting the operation to obtain the unsharp mask density. One example of such simplification methods is to obtain the simple arithmetic mean (non-weighted arithmetic mean) over a rectangular area enclosed with two lines parallel to the primary scanning direction and two lines parallel to the sub-scanning direction. In other words, the unsharp mask density Dus is obtained by calculating the simple arithmetic mean of the original image densities Dorg within the rectangular area. Another example of such simplifications is to make a blurred signal in the primary scanning direction by transmitting the analog signal of the original image density through a low-pass filter and then obtaining the arithmetic mean of the A/D converted digital signals in the sub-scanning direction.

In the former method in which the unsharp mask density Dus is obtained by a simple arithmetic mean within a rectangular area, it has been proved by the present inventors that the results in the diagnostic efficiency and accuracy were as good as those obtained by use of the ideal circular unsharp mask having a Gaussian distribution in its weighting coefficient, although the above method should have defects in that the rate of unsharpness is different in the direction and further the transfer function has an undesirable fluctuation as compared with the mask having a smoothly changing weighting coefficient in the form of Gaussian distribution. Further, this method is much more advantageous in that the operation is very simple and accordingly does not take a long time, which results in high speed and low cost of the image processing apparatus. These advantages are true for both the analog and degital signals.

In more detail, in case that the weighting coefficient $\alpha_{ij}$ should be multiplied to the original density Dorg(i,j) at every scanning point (i,j), the unsharp mask density Dus(IJ) is obtained by the operation represented by the formula $$Dus(IJ) = \sum_{i,j} \alpha_{ij} \cdot Dorg(i,j) \qquad (3)$$

where i, j are the numbers indicating the coordinate of the scanning point or picture element, and I, J are the numbers indicating the coordinate of the unsharp mask.

$$\left( \sum_{i,j} \alpha_{ij} = 1 \right)$$

Therefore, the number of calculations is about $N^2$ times of multiplications and about $N^2$ times of additions, N being the number of the picture elements included in an unsharp mask arranged in one direction. Accordingly, when the number of the picture elements within the unsharp mask is large it takes a very long time to obtain the unsharp mask density Dus. For example, therefore, when the size of the unsharp mask is 6 mm×6 mm and 3600 picture elements (0.1 mm×0.1 mm) are included in the unsharp mask, 3600 times of multiplications and 3600 times of additions must be repeated. When an 8 bit microcomputer is used to conduct these calculations with 3 msec for one multiplication and 5 μsec for one addition, it takes about 3 msec×3600+5 μsec×366≠11 sec to obtain one unsharp mask density.

In contrast to this, in accordance with the above mentioned former method using the simple arithmetic mean, the time taken for obtaining the unsharp mask density can be considerably reduced. For example, it only takes 18 msec for obtaining one unsharp mask density. Further, by use of the algorithms mentioned below the number of calculations can be reduced only to 4 times, which results in a very shortened time of operation of only several tens of μsec for obtaining one unsharp mask density Dus. In other words, the unsharp mask density Dus(IJ) can be obtained by $$Dus = \frac{1}{N^2} (\Sigma Dij) \qquad (4)$$

which means only $N^2$ times of additions and one division. In more detail, when the unsharp mask has a rectangular shape having a size of $N_1$ in the primary scanning direction and $N_2$ in the sub-scanning direction in terms of the number of picture elements, the unsharp mask density Dus(IJ) is represented by the formula of $$Dus(IJ) = \frac{1}{N_1 \times N_2} (\Sigma Dij) \qquad (5)$$

wherein i is a number in the range of $$I - \frac{N_1 - 1}{2} \text{ to } I + \frac{N_1 - 1}{2}$$

j is a number in the range of $$J - \frac{N_2 - 1}{2} \text{ to } J + \frac{N_2 - 1}{2}$$

and $N_1$ and $N_2$ are positive odd numbers. This means that the unsharp mask density can be obtained by $N_1 \times N_2$ times of additions and only one division. Further, by improving the process of operation the number of calculations to obtain one unsharp mask density can be reduced to 4 times in average.

Since the modulation transfer function of the rectangular unsharp mask having a uniform weighting becomes a sinc function $$\left( \text{sinc}(x) = \frac{\sin \pi x}{\pi x} \right),$$

the aforesaid definition that the spatial frequency fc in which the modulation transfer function becomes 0.5 is 0.01 to 0.5 cycle/mm, preferably 0.02 to 0.15 cycle/mm is equivalent to that the rectangular unsharp mask has a size of 60 mm to 1.2 mm, preferably 30 mm to 4 mm. Further, in case that the sharp of the unsharp mask is an elongated rectangle, each side of the rectangle is preferred to have a length within the above range. In case of the image processing of a tomography with linear motion, the unsharp mask is preferred to have an elongated rectangular shape.

In the latter method in which a low-pass filter is used for obtaining a unsharp mask density Dus, it has also been proved by the present inventors that the results in the diagnosis efficiency and accuracy were as good as those obtained by use of the ideal circular unsharp mask having a varying weighting coefficient, although the above method does not have a uniform balanced weighting coefficient. Further, this method is much more advantageous in that the operation is very simple and accordingly does not take a long time by only performing a low-pass filtering of the analog signal in the primary scanning direction thereby making the operation of the digital signals that will take some time unnecessary. This results in high speed and low cost of the image processing apparatus. In addition, if the addition of the digital signals in the sub-scanning direction is made to be a simple arithmetic addition to obtain an arithmetic mean, there is no need to conduct multiplication, which also results in simplification of the apparatus and speed up of the operation. It has also been proved by the present inventors that even with such a very simplified method the resulting diagnostic efficiency and accuracy are not substantially lower than that resulting from the method in which the unsharp mask is obtained through an ideal operation which requires a long time.

In the present invention, it is possible to conduct a smoothing process in addition to the above mentioned unsharp masking process. In general, since there appear noises particularly in the high frequency range, the diagnostic efficiency and accuracy are normally enhanced by conducting a smoothing process. As for the smoothing process, it is desirable to make the modulation transfer function not less than 0.5 at the spatial frequency of 0.5 cycle/mm and not more than 0.5 at the spatial frequency of 5 cycle/mm. The desirable extent of smoothing depends upon the kinds of the radiation image. For instance, in case of the chest tomography in which the pattern having a comparatively low frequency is to be observed, it is desired that the noise be removed as much as possible. To the contrary, in case of the angiography in which the fine patterns including fine blood vessels of high frequency, the too much smoothing will damage the fine patterns and lowers the quality of the image. According to the research by the present inventors, however, the diagnostic efficiency and accuracy are enhanced for almost all the kinds of radiation image when the smoothing process is conducted within said range. Furthermore, it has also been confirmed that the smoothing process is effective not only when it is applied to the density D' after the unsharp masking process but also when it is applied directly to the original image density Dorg.

Further, in this invention, a gradation processing can be conducted in addition to the above unsharp masking process. The gradation processing (such as contrast enhancement using non-linear or linear signal transformation) is particularly effective for the radiographic image in which the density is gently changed over a wide range such as the image of lung cancer or mamma cancer. The gradation processing applicable to the radiographic image copying system is shown in Japanese Patent Application Nos. 53(1978)-163574 and 54(1979)-23090 filed by the same applicant. The gradation processing can be conducted before or after the unsharp masking process.

Now the present invention will be described in more detail with reference to the accompanying drawing as briefly described below.

BRIEF DESCRIPTION OF THE DRAWING

FIGS. 7 and 8 are block diagrams which show examples of a circuitry for obtaining the unsharp mask density in some embodiments of the present invention, FIG. 14 is an explanatory view showing the unsharp mask, picture elements and so forth for explaining another algorithm to calculate the unsharp mask signal, FIGS. 15A to 15D are view which show the capacity of the memories used for carrying out the algorithm as explained in FIG. 14, FIG. 16 is a partial explanatory view which explains in more detail the algorithm as explained in FIG. 14, FIGS. 17A, 17B and 19 are graphs which show the relationship between the emphasized frequency and the evaluation of the resulting images in diagnostic efficiency and accuracy.

DESCRIPTION OF THE PREFERRED EMBODIMENTS

Now the present invention will be described in more detail with reference to its particular embodiments thereof.

Figure 1:
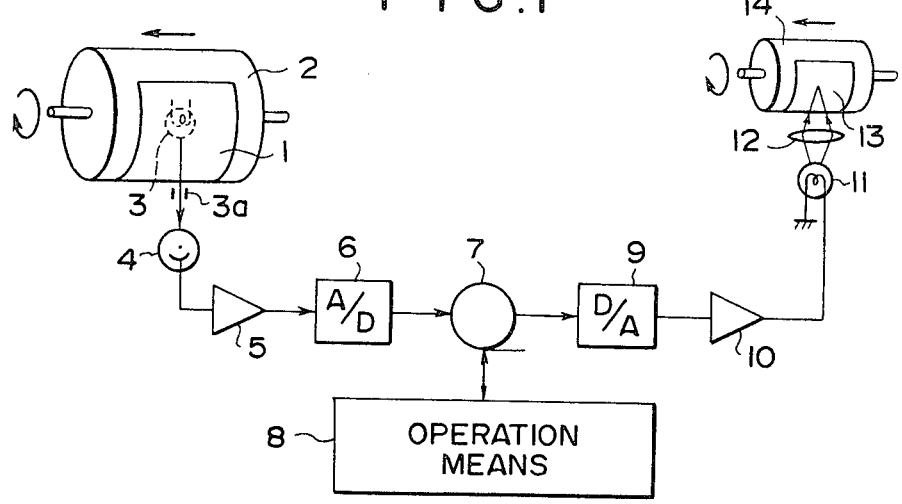
FIG. 1 is a schematic view which shows a radiographic image copying system employing the method of processing the radiographic image in accordance with the present invention.

FIG. 1 shows an example of the radiographic image copying system in which the image processing method of the present invention is employed. Referring to FIG. 1, the original radiograph 1 is mounted on a transparent drum 2. The transparent drum 2 is rotatable about its axis and movable in the axial direction simultaneously. Within the transparent drum 2 is provided a read-out light source 3 which emits light passing through the drum 2. The light emitted by the light source 3 transmits through the drum 2 and the original radiograph 1 mounted thereon in the form of a thin light beam.

The light beam passing though the original radiograph 1 is received by a photodetector 4 through an aperture 3a. The output of the photodetector 4 is amplified by an amplifier 5 and then converted to a digital signal by an A/D converter 6. The digital signal is recorded on a magnetic tape 7.

The digital signal memorized in the magnetic tape 7 is read out by an operation means 8 like a mini-computer and after the unsharp mask density Dus is obtained the unsharp masking process is conducted. The image processing is mainly an emphasis of the super-low frequency that is an unsharp masking process. In addition to the unsharp masking process, variation of the emphasis coefficient $\beta$, gradation process, image reduction process, smoothing process and the like are conducted to further enhance the diagnostic efficiency and accuracy of the finally resulting image.

The unsharp masking process is conducted by performing the operation represented by the formula $$D' = Dorg + \beta(Dorg - Dus). \qquad (6)$$

The unsharp mask density Dus obtained by the method as mentioned hereinafter should have a modulation transfer function of not less than 0.5 at the spatial frequency of 0.01 cycle/mm and not more than 0.5 at the spatial frequency of 0.5 cycle/mm, preferably not less than 0.5 at the spatial frequency of 0.02 cycle/mm and not more than 0.5 at the spatial frequency of 0.15 cycle/mm. Further, in order to conduct the operation of the above formula, the emphasis coefficient $\beta$ must be determined. These values are predetermined for the various portions of the human body or the object to be diagnosed in advance or determined case by case by an external operation. When these values are predetermined for the various objects, those values are memorized in the memory of the operation means used for the signal processing.

The density D' obtained by the unsharp masking process as mentioned above is further subjected to a smoothing process for reducing the high frequency component. By the smoothing process, noises are reduced without damaging the information necessary for diagnosis.

The operation with the unsharp mask will hereinbelow be described in detail with reference to FIGS. 2A to 2D.

Figure 2A:
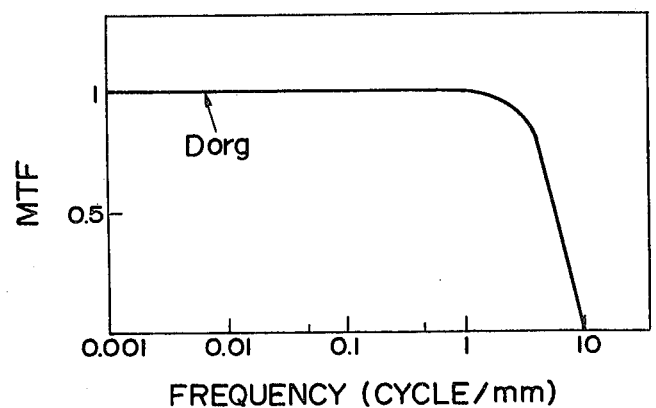
FIGS. 2A to 2F are graphs which show the steps of frequency emphasis employed in the present invention.

FIG. 2A shows the frequency response where the original radiograph is sampled with 10 picture elements (pixel)/mm. The frequency response or the modulation transfer function (MTF) is known to be represented by a sinc function when an aperture with rectangular weighting is used as the aperture for the photodetector and a Gaussian function when an aperture with Gaussian function weighting is used.

Figure 2B:
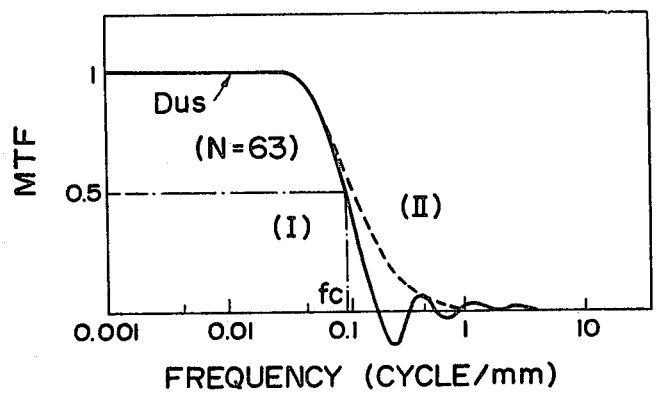

FIG. 2B shows the modulation transfer function of a rectangular unsharp mask (I) and a Gaussian unsharp mask (II) which is not less than 0.5 at 0.01 cycle/mm and not more than 0.5 at 0.5 cycle/mm. In case of the unsharp mask of the curve (I), the unsharp mask density was calculated by obtaining an arithmetic mean of about 63 picture elements × 63 picture elements (represented by the size N=63) on the original radiograph sampled with 10 picture elements (pixel)/mm. This is equivalent to the case where the image on the original radiograph is scanned with a light beam having a size of cross section of 6.3 mm × 6.3 mm. In case of the unsharp mask of the curve (II), the unsharp mask density was calculated by obtaining a weighted mean with a Gaussian distribution weighting coefficient. Other factors were all that same as those used in case of the curve (I). Tests by the present inventors showed that the results in terms of the diagnostic efficiency and accuracy were almost the same for the two unsharp masks (I) and (II) having a different shape of MTF in their high frequency range.

The description hereinbelow with reference to FIGS. 2C to 2F will be made based on a rectangular unsharp mask for the sake of simplification.

Figure 2C:
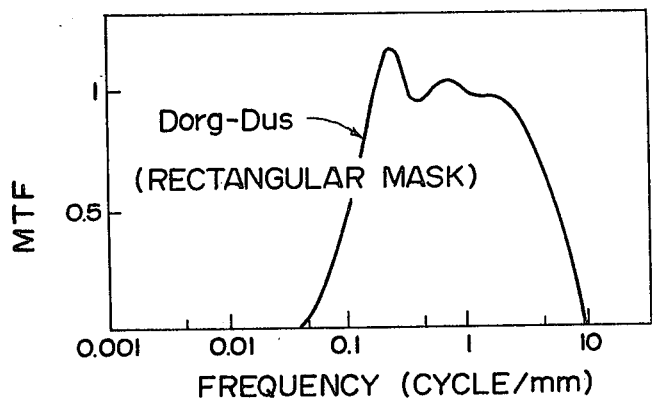

FIG. 2C shows the modulation transfer function of the operated signal of (Dorg-Dus).

Figure 2D:
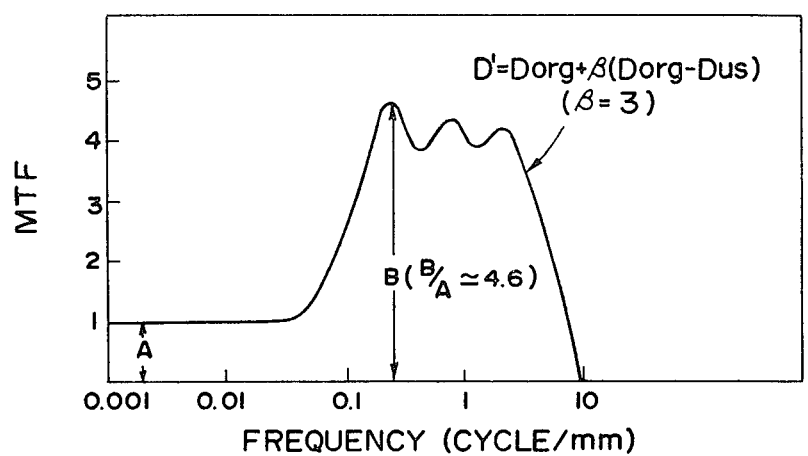

FIG. 2D shows the result of the operation corresponding to the density D' where the emphasis coefficient $\beta$ is fixed at 3. As a result as shown, the maximum value (B) of the MTF of the emphasized image signal is about 4.6 times as large as the value (A) of MTF which is a limit value where the spatial frequency is infinitely close to zero.

Figure 2E:
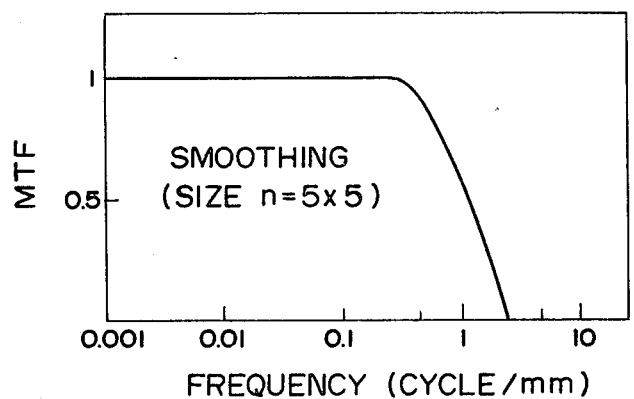

FIG. 2E shows an example of the modulation transfer function when the smoothing process is conducted in the high frequency range (0.5 to 5 cycle/mm or more). FIG. 2E shows the MTF in case that the smoothing process with 5 pixel × 5 pixel is applied to the density.

Figure 2F:
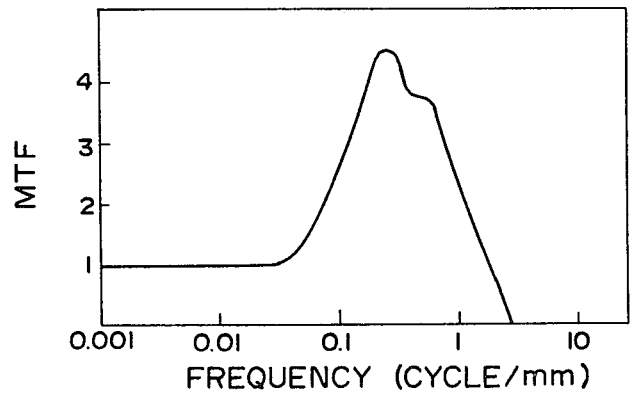

FIG. 2F shows the modulation transfer function where the smoothing process is conducted for the density D' shown in FIG. 2D.

FIGS. 3A to 3D show the variation of the emphasis coefficient $\beta$ varied as a function of the density represented by the original radiograph image density Dorg or the unsharp mask density Dus.

Figures 3A, 3B, 3C, 3D:
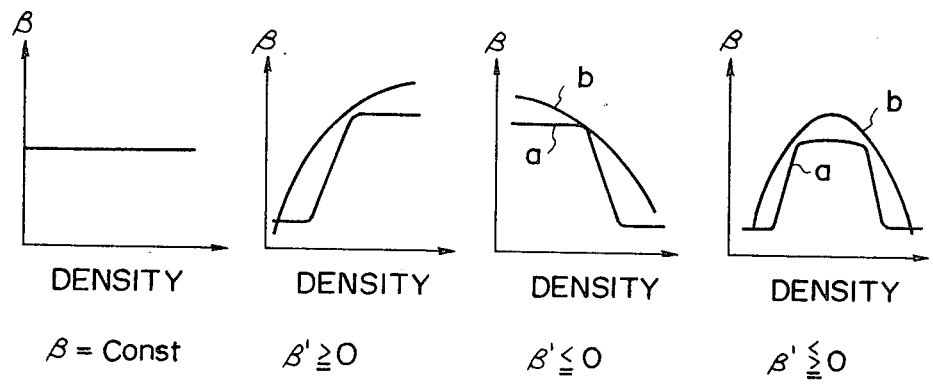
FIGS. 3A to 3D are graphs which show the various ways of changing the emphasis coefficient $\beta$ with respect to the original image density Dorg or the unsharp mask density Dus.

FIG. 3A shows a flat type in which $\beta$ is fixed at a constant value. FIG. 3B shows a monotone increasing type ($\beta' \geq 0$), FIG. 3C shows a monotone decreasing type ($\beta' \leq 0$) and FIG. 3D shows a medium density emphasis type. The type as shown in FIG. 3C can also be named as "low density emphasis type" like the type as shown in FIG. 3D named as medium density emphasis type, both types including a range where $\beta' < 0$. The variation of the emphasis coefficient $\beta$ represented by FIGS. 3B, 3C and 3D has a stepped type as indicated by the curve a and a smooth curved type as indicated by the curve b.

By varying $\beta$ as a monotone increasing function as shown in FIG. 3B, it is possible to prevent the formation of an artifact-image which is liable to appear with frequency emphasis. As one example thereof, when the X-ray image of a stomach (Magen) obtained using a barium sulfate contrast medium is subjected to said frequency emphasis (enhancement of particular spatial frequency components) or the unsharp masking process with the emphasis coefficient $\beta$ fixed, the boundary of the low density area having a uniform low density over a wide range corresponding to the portion containing the barium sulfate contrast medium is overemphasized and an artifact-image having a double contour will appear. If the emphasis coefficient $\beta$ is changed so that it is made small in the low density region for the portion filled with the contrast medium and is made large in the high density region for the stomach details or the like, the occurrence of the artifact-image having the double contour can be prevented. Further, in case of the front chest image, if $\beta$ is fixed the noise increases in the low density region like the spine and the heart and in an extreme case the fine portions become only saturated white (the fog level of the recording medium), which disturbs badly the visual observation and markedly lowers the diagnostic efficiency and accuracy. To the contrary, if $\beta$ is made small in the low density regions like the spine or the heart and made large in the high density region like the lung, the above mentioned noise and the saturated white areas can be reduced.

The low density emphasis as shown in FIG. 3C is suitable for the object in which the diagnosis of the low density portion is particularly important and the area of the low density portion does not occupy a major part of the whole image. For instance, the angiography or the lymphography is desirable to be subjected to the frequency emphasis of this type since in these objects it is desired that the sharpness of a particular part be much increased even if a noise is somewhat increased. Thus, the diagnostic efficiency and accuracy are highly enhanced in these objects by the low density emphasis.

The medium density emphasis as shown in FIG. 3D is suitable for the object in which the diagnosis of the medium density portion is particularly important and the low and high density portions occupy a major part of the whole image and are not important for diagnosis. For instance, the cholecystography or the liver is desirable to be subjected to the frequency emphasis of this type since in these objects it is desired that only the medium density portion be emphasized and the noise and the air portion which lower the diagnostic efficiency and accuracy should not be emphasized.

In any example of the above types, if the emphasis coefficient $\beta$ is fixed at a small value for the frequency emphasis, the diagnostic efficiency and accuracy are not enhanced since the contrast of the important portions like the stomach detailes, the blood vessels of the lung and veins is not enhanced although various artifact-images may be prevented. Thus, by changing the emphasis coefficient $\beta$ continuously according to the density of the original radiographic image, it is possible to obtain a radiographic image having high diagnostic efficiency and accuracy controlling the occurrence of the artifact-image.

Figure 4:
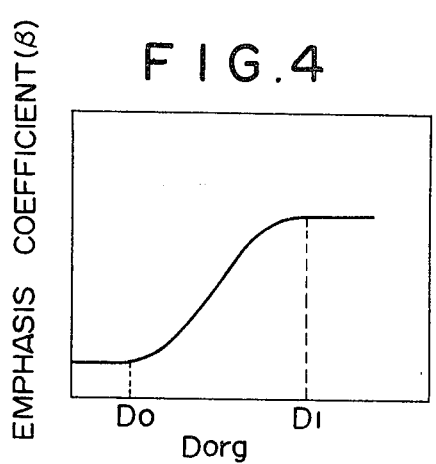
FIG. 4 is a graph which shows an example of the variation of the emphasis coefficient $\beta$ with respect to the value of the original image density Dorg.

FIG. 4 shows another example of the change of $\beta$ according to the original image density Dorg. In this example, $\beta$ is changed almost linearly between the maximum density $S_1$ and the minimum density $S_0$ which are obtained from a histogram of the original radiographic image. The maximum and minimum values $S_1$ and $S_0$ are determined according to the sort of the X-ray image to be processed. For instance, the maximum and minimum densities may be determined as the density where the integrated histogram becomes 90 to 100% and 0 to 10%, respectively.

Figure 5:
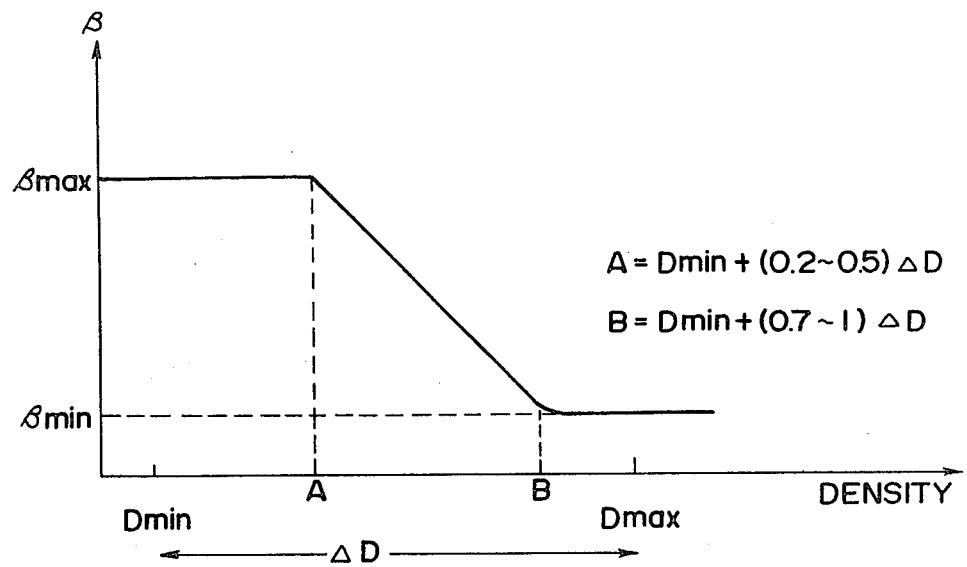
FIGS. 5 and 6 are graphs which show examples of the variation of the emphasis coefficient $\beta$ with respect to the image density.
Figure 6:
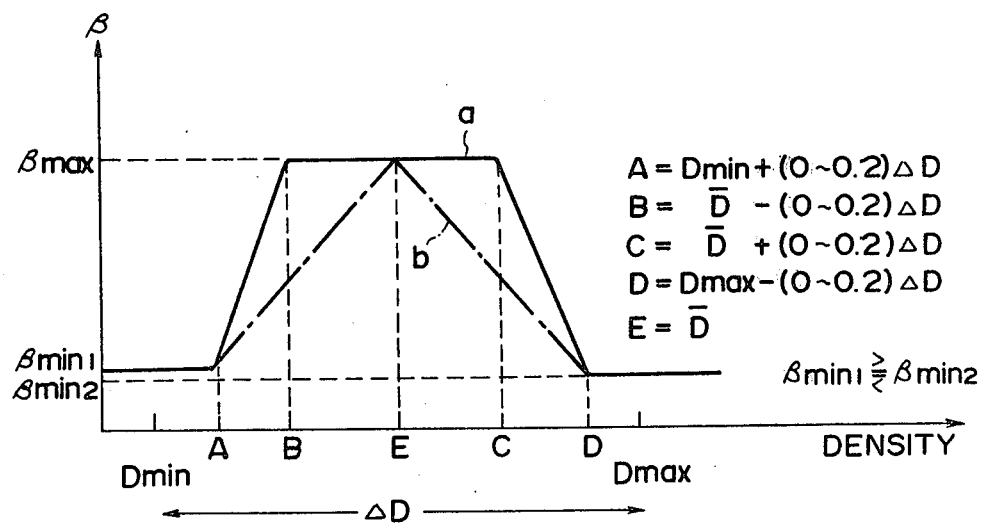

FIGS. 5 and 6 are graphs showing examples of the change of $\beta$ for the low density emphasis and medium density emphasis, respectively.

In FIG. 5, $\beta$ is decreased from the maximum value $\beta$max to the minimum value $\beta$min while the density changes from A to B. In other words, in the low density area (from Smin to A) the emphasis coefficient $\beta$ is made maximum ($\beta$max) and in the high density area (from B to Dmax) the emphasis coefficient $\beta$ is made minimum ($\beta$min). The density A is desired to be a sum of the minimum density (Dmin) and the 0.2 to 0.5 times of the difference ($\Delta$D) between the maximum density (Dmax) and the minimum density (Dmin), i.e. [Dmin+(0.2 ... 0.5)×$\Delta$D]. The density B is desired to be a sum of Dmin and 0.7 to 1 times of $\Delta$D, i.e. [Dmin+(0.7 ... 1)×$\Delta$D].

In FIG. 6 as shown by the solid line a, $\beta$ is increased from the first minimum ($\beta$min1) to the maximum ($\beta$max) between density A and B, and decreased from the maximum ($\beta$max) to the second minimum ($\beta$min2) between density C and D. In other words, in the low density area (Dmin to A) and the high density area (D to Dmax) the emphasis coefficient is made small ($\beta$min1, $\beta$min2), and in the medium density area (B to C) the emphasis coefficient is made large ($\beta$max). The first minimum value ($\beta$min1) and the second minimum value ($\beta$min2) may be equal to each other. In case of the change as shown by the chain line b differently from the above mentioned change shown by the solid line a, the emphasis coefficient $\beta$ increases between A and E and decreased between E and D. In FIG. 6, the density A, B, C, D and E should preferably be the minimum density (Dmin) plus 0 to 0.2 times of the difference ($\Delta$D) between the maximum density (Dmax) and the minimum density (Dmin), i.e. Dmin+(0 ... 0.2)×$\Delta$D, the mean density $$(\overline{D} = \frac{Dmin + Dmax}{2}$$

or a statistical mean) minus 0 to 0.2 times of said difference ($\Delta$D), i.e. $\overline{D}-(0 ... 0.2)\times\Delta D$, the mean density ($\overline{D}$) plus 0 to 0.2 times of said difference ($\Delta$D), i.e. $\overline{D}+(0 ... 0.2)\times\Delta D$, the maximum density (Dmax) minus 0 to 0.2 times of said difference ($\Delta$D), i.e. Dmax$-(0 ... 0.2)\times\Delta D$, and the mean density $\overline{D}$, respectively.

In the above operation using the emphasis coefficient changing as shown in FIGS. 5 and 6, the maximum and minimum densities (Dmax), (Dmin) are both the maximum and minimum densities within the necessary image for diagnosis, that is, there may be higher or lower density portions outside the substantial image within the original radiograph. When desired, the maximum and minimum densities may be selected as the maximum and minimum densities within the whole area of the original radiograph.

Further, according to the inventors' experiments, it has been found that the results are almost the same between the emphasis coefficient $\beta$ changed with the original image density and that changed with the unsharp mask density.

In addition to the above mentioned frequency emphasis by use of the unsharp mask, it is possible to provide a gradation process for changing the gradation of the image. When the gradation process is conducted before the unsharp masking process, the A/D conversion is conducted after the signal has been gradation processed with a non-linear analog circuit. When the gradation process is conducted after the unsharp masking process, the gradation process can be conducted in the digital form or may be conducted in the analog form after D/A conversion. Further, it is possible to conduct the gradation process in the digital form after A/D conversion before the unsharp masking process.

The data which have been subjected to the frequency emphasis and further to the gradation process as occasion demands are recorded on a magnetic tape 7. The data recorded on the magnetic tape 7 are read out and converted to an analog signal by a D/A converter 9 and the analog signal is used to modulate a recording light source 11 after amplified by an amplifier 10. The recording light emitted by the light source 11 exposes a recording film 13 mounted on a drum 14 by way of a lens 12. The drum 14 is rotatable about its axis and movable in the axial direction. Thus, an image subjected to the frequency emphasis of the unsharp masking process is recorded on the film 13. The image finally recorded on the film 13 is used for performing the diagnosis.

When the image is reproduced finally on the photographic film, a size reduced image can be obtained by recording the image with a higher sampling frequency than the frequency at the time of input scanning. For instance, if the input scanning system has a sampling frequency of 10 pixel/mm and the output scanning system has a sampling frequency of 20 pixel/mm, the finally obtained image has a $\frac{1}{2}$ reduced size with respect to the original image size.

The size reduced image having a reduction rate of $\frac{1}{2}$ to $\frac{1}{3}$ is desirable for enhancing further the diagnostic efficiency and accuracy since the frequency component which is necessary for diagnosis becomes close to the frequency at the highest visibility and accordingly the contrast appears to have been raised to the observer.

Now, the preferred methods of operation for obtaining the unsharp mask density will be described in detail.

FIG. 7 shows an example of one method for carrying out the operation for obtaining the unsharp mask density Dus. Referring to FIG. 7, the output of the photodetector 21 which measures the light transmitted through the original radiograph is amplified by an amplifier 22 which performs amplification including non-linear correction or band compression like logarithmic conversion to obtain an original image density Dorg. The original image density Dorg is fed to an operation unit 23 for conducting the unsharp masking process with said formula (1) on one hand and on the other hand sent to a low-pass filter 24 to obtain the unsharp mask density Dus. In the low-pass filter 24, the analog value of Dorg is filtered with only its super-low frequency component being transmitted therethrough and then converted to a digital signal Di by an A/D converter 25. The converted digital signal is used for calculating an arithmetic mean value $$Dus = \sum_{i=j}^{N} a_i \cdot Di$$

by a digital calculating circuit 26. The obtained value is fed to the operation unit 23 as the unsharp mask density Dus. In this formula, $a_i$ is a weighting coefficient for the signal Di coming from the A/D converter 25. In case of a simple arithmetic mean, $a_i$ is made to be equal to 1/N, N being the number of the scanning lines counted in the sub-scanning direction over a range to be covered by an unsharp mask.

As shown in FIG. 7, the original image density Dorg is fed to the operation unit 23 in the form of analog signal. Since this density Dorg has been obtained before the unsharp mask density Dus is fed to the unit 23, it is necessary to delay the input of the original image density Dorg so that both the densities Dorg and Dus are simultaneously fed to the unit 23. Alternatively, the original image density Dorg may be once memorized in a memory after converted to a digital value and read out from the memory when it is used together with the unsharp mask density Dus. In any way, it is necessary to delay the input of the original image density Dorg into the unit 23 by the time required for the unsharp mask density Dus to be calculated through the low-pass filter 24, the A/D converter 25 and the circuit 26, so that the densities Dorg and Dus are fed to the operation unit 23 simultaneously.

The cut-off frequency of the low-pass filter 24 is selected by a relation among the spatial frequency of 0.01 to 0.5 cycle/mm or preferably 0.02 to 0.15 cycle/mm, the picture element size (mm/pixel), and the picture element frequency (pixel/sec). In other words, the cut-off frequency (6 dB down) of the low-pass filter 24 designated by $f_{LP}$ (cycle/sec) is determined by the formula $$f_{LP}(\text{cycle/sec}) = f_c(\text{cycle/mm}) \times d(\text{mm/pixel}) \times n\text{-(pixel/sec)} \quad (7)$$

where the desired spatial frequency is $f_c$ (cycle/mm), the picture element size is d (mm/pixel), and the picture element frequency in the primary scanning direction is n (pixel/sec).

It will be noted that the output of the photodetector 21 which has been described as amplified before the low-pass filtering in the above example shown in FIG. 7 may be amplified after the low-pass filtering as shown in FIG. 8. In the example shown in FIG. 8, the output of the photodetector 21 is divided into two outputs one of which is fed to a low-pass filter 24 and the other of which is fed to an amplifier 22a which performs, if necessary, non-linear correction like log-compression. The output of the amplifier 22a is taken out as an original image density Dorg and on the other hand the output of the low-pass filter 24 is fed to another amplifier 22b equivalent to said amplifier 22a. The output of the amplifier 22b is fed to the digital calculating circuit 26 for obtaining an arithmetic mean value $Dus = \Sigma a_i Di$ through an A/D converter 25. The output of the calculating circuit 26 is the unsharp mask density Dus and is fed to an operation unit 23 for performing the unsharp masking process together with the original image density Dorg by use of the formula D′=Dorg+β(Dorg−Dus).

Figure 9:
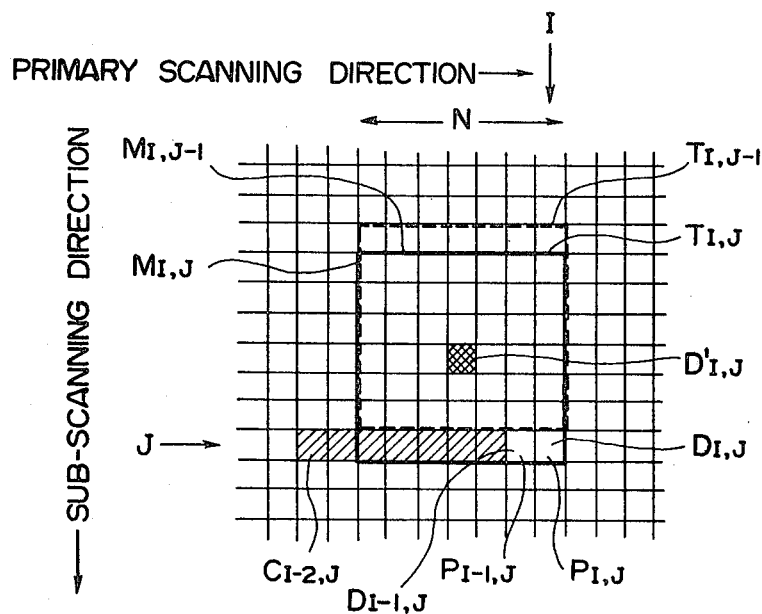
FIG. 9 is an explanatory view showing the unsharp mask, picture elements and so forth for explaining an algorithm to calculate the unsharp mask density.

FIG. 9 illustrates the picture elements and the way of algorithm which is preferred in calculating the unsharp mask density in accordance with another preferred embodiment of the present invention.

Referring to FIG. 9, it is assumed that an unsharp mask $M_{I,J}$ is rectangular as indicated with a solid line enclosed with two parallel lines extending in the primary scanning direction and two parallel lines extending in the sub-scanning direction. In the drawing, the primary scanning direction means the horizontal scanning direction. The sub-scanning direction means, of course, the vertical scanning direction. In order to simplify the following explanation, the unsharp mask is assumed to be square. The length of one side of the square mask is N in terms of the number of the picture elements, where N is a positive odd number. The unsharp mask $M_{I,J}$ is calculated for the density $D'_{I,J}$ based on all of the original image densities for the picture elements included in the mask $M_{I,J}$. $D'_{I,J}$ is the final density to be obtained by the formula [D′=Dorg+β(Dorg−Dus)] for a scanning point (picture element) at the center of the mask. $D_{I,J}$ is the original image density for the picture element $P_{I,J}$ at the top of the mask $M_{I,J}$. After getting the $D_{I,J}$, the calculator of the unsharp mask of attention finally becomes possible. $T_{I,J}$ is the total sum of all the densities of the picture elements within the mask $M_{I,J}$ having a number of $N^2$, that is $$T_{I,J} = \sum_{j=J-N+1}^{J} \sum_{i=I-N+1}^{I} D_{ij}. \quad (8)$$

At first, the density $D_{IJ}$ of the picture element $P_{IJ}$ of attention is stored in the corresponding address of the sum D in memory. Each address should have a number of bits capable of indicating the signal value of the picture element, for instance 8 bits.

Then, the sum $C_{IJ}$ of the densities of the N picture elements in the direction of primary scanning represented by the formula $$C_{IJ} = \sum_{i=I-N+1}^{I} D_{ij}. \quad (9)$$

is obtained. This can be obtained by a formula $$C_{IJ} = C_{I-1,J} + D_{I,J} - D_{I-N,J} \quad (10)$$

by use of the sum $C_{I-1,J}$ of the densities of the N picture elements arranged before the picture element $P_{IJ}$ in the line of the element $P_{IJ}$, the density $D_{I-N,J}$ of the picture element located at N picture elements before the picture element $P_{IJ}$ of attention, and the density $D_{IJ}$ of the picture element $P_{IJ}$. The sum $C_{IJ}$ is stored in the corresponding address of the sum C in memory. Each address of this memory needs a number of bits required for preventing overflow, which depends upon the number N.

Then, the total sum $T_{IJ}$ of the densities of the $N^2$ picture elements within the mask $M_{IJ}$ is obtained. This can be obtained by the formula $$T_{IJ} = T_{I,J-1} + C_{I,J} - C_{I,J-N} \quad (11)$$

by use of the total sum $T_{I,J-1}$ of the densities of the $N^2$ picture elements within the mask $M_{I,J-1}$ which is one line back to the sub-scanning direction from the mask $M_{I,J}$ including the picture elements $P_{I,J}$, the sum $C_{I,J-N}$ of the densities of the N picture elements in the last line of the mask $M_{I,J-1}$ which is not contained in the mask $M_{IJ}$, and the sum $C_{IJ}$ of the densities of the picture elements in the top line including the picture element $P_{IJ}$. The obtained value $T_{IJ}$ is stored in the corresponding address of the total sum T in memory. Since the total sum $T_{IJ}$ is the value $N^2$ times as large as the unsharp mask value, the unsharp masking process can be conducted by use of this value with the formula $$D'_{IJ} = D_{I-\frac{N-1}{2}, J-\frac{N-1}{2}} + \quad (12)$$

$$\beta \left( D_{I-\frac{N-1}{2}, J-\frac{N-1}{2}} - \frac{T_{IJ}}{N^2} \right).$$

Figure 10A:
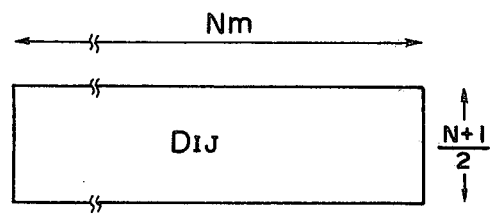
FIGS. 10A to 10C are views which show the capacity of the memories used for carrying out the algorithm as explained in FIG. 9.
Figure 10B:
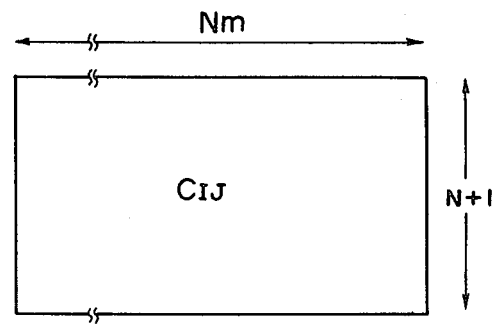
Figure 10C:
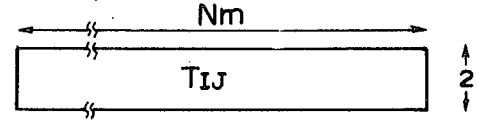

The capacity of memory necessitated for the above operation will be described hereinbelow. FIG. 10A shows memory for the densities of $D_{IJ}$ which should have $N+1/2$ words in the sub-scanning direction and Nm words in the main scanning direction. Nm is the number equal to or close to the number of all the picture elements in the main scanning direction. One word of this memory may have 8 bits for instance. FIG. 10B shows memory for the sum $C_{IJ}$ which should have $N+1$ words in the sub-scanning direction and Nm words in the main scanning direction. One word of this memory should have twice or three times bits as many as the above word for $D_{IJ}$. FIG. 10C shows memory for the total sum $T_{IJ}$ which should have only two words in the sub-scanning direction and Nm words in the main scanning direction.

Figure 11:
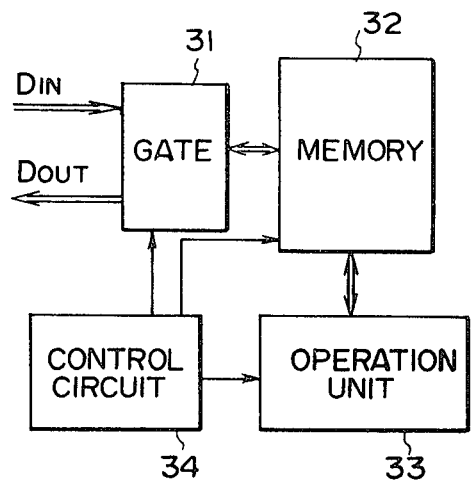
FIG. 11 is a block diagram which show an example of the circuitry for carrying out the algorithm as explained in FIG. 9, FIGS. 12 and 13 are views which show the variations of the memories used for carrying out the above algorithm.

FIG. 11 shows an example of the circuit block diagram for carrying out the above operation. The original image input density $D_{IN}$ fed to a gate 31 is transmitted to memory 32 having said capacity and stored therein. Based on the stored information, an operation unit 33 performs the operation. The gate 31, memory 32, and operation unit 33 are controlled by a control circuit 34. The results of the operation by the operation unit 33 is output from the gate 31 through memory 32 as an image output signal $D_{OUT}$.

According to the above method of operation, the operation for obtaining the unsharp mask density Dus is markedly simplified and accordingly the apparatus for carrying out the operation is also simplified to a great extent. This simplification is based on the method utilizing the rectangular mask and obtaining a simple arithmetic mean of the densities within the rectangular mask. In other words, in accordance with this method calculating the simple arithmetic mean of the densities within a rectangular mask, a markedly simplified algorithm as explained above can be utilized and the operation can be markedly simplified. Thus, the radiographic image processing can be very simply put into practice in accordance with this invention.

Figure 12:
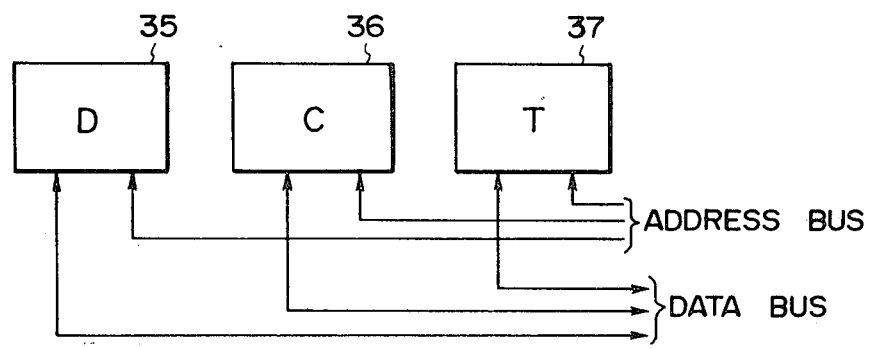
Figure 13:
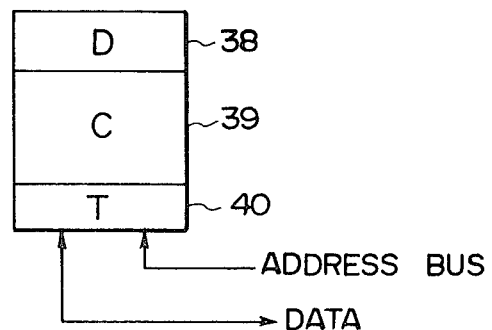

Further, in the above explanation, the memories for the three kinds of information 35, 36 and 37 may be divided as shown in FIG. 12 so that the address bus and the data bus are divided into three groups and the three kinds of information can be simultaneously accessed. Further, as shown in FIG. 13, it is possible to make the three memories connected in series so that the addresses are continued in the three memories in series. In the example as shown in FIG. 12, the time for operation is further shortened.

The control circuit and the operation unit may be made by a particularly designed hardware such as PLA (Programmable Logic Array) or Random Logic Circuits. Or, a micro-computer or a mini-computer can be used for the control circuit and operation unit. Or, a micro-computer, for example bit slice type, ray be used for the control circuit and a particularly designed circuit may be used for the operation unit. In the practical circuit, a proper hardware is selected according to the required operation speed.

Another algorithm which enables further reduction of the capacity of memory will be described hereinbelow referring to FIGS. 14, 15 and 16.

In this algorithm, after the density $D_{IJ}$ of the top picture element $P_{IJ}$ of attention in the unsharp mask $M_{IJ}$ is stored in the corresponding address in memory for D, the sum $E_{IJ}$ of the densities of the N picture elements in the sub-scanning direction, that is $$E_{I,J} = \sum_{j=J-N+1}^{J} D_{IJ} \quad (13)$$

is calculated and is stored in the corresponding address in memory for E. This calculation is conducted by use of the formula $$E_{I,J} = E_{I,J-1} + D_{I,J} - D_{I,J-N} \quad (14)$$

By use of the stored values, the total sum $T_{I,J}$ equivalent to $N^2$ times as large as the unsharp mask signal value is obtained by use of the formula $$T_{I,J} = T_{I-1,J} + E_{I,J} - E_{I-N,J}. \quad (15)$$

By this method it is impossible to carry out the calculation (of the formula (15) when the primary scanning returns from the right end to the left end. Therefore, the sum of N densities $D_{I,J}$ of left side of the primary scanning line that is indicated by $R_J$ represented by the formula $$R_J = \sum_{i=1}^{N} D_{ij} \quad (16)$$

is calulated at first and is stored in the corresponding address in memory for R. The $R_J$ is, as shown in FIG. 16, represented as $R_1$ that is the sum of $D_{1,1}$ to $D_{5,1}$ and $R_5$ that is the sum of $D_{1,5}$ to $D_{5,5}$ when N=5, for instance. When the picture element of attention changes from $D_{5,5}$ to $D_{6,5}$, the $R_5$ does not change.

Therefore, when the primary scanning returns from the right end to the left end, the $T_{I,J}$ is obtained by use of said $R_J$ by the formula $$T_{I,J} = T_{I,J-1} + R_J - R_{J-N}. \quad (17)$$

By use of the obtained $T_{I,J}$, the unsharp masking process is conducted by the formula $$D'_{I,J} = D_{I-\frac{N-1}{2}, J-\frac{N-1}{2}} + \quad (18)$$

-continued $$\beta \left( D_{I-\frac{N-1}{2}, J-\frac{N-1}{2}} - \frac{T_{I,J}}{N^2} \right).$$

This algorithm needs memory for the density $D_{I,J}$ which has N+1 words in the sub-scanning direction and Nm words in the primary scanning direction as shown in FIG. 15A. However, this algorithm only needs very small memories for R, E and T as shown in FIGS. 15B, 15C and 15D. Memory for R and E need N+1 words and memory for T only needs two words. One word of memory used for D may only need for instance 8 bits, but one word of memory used for R, E and T need for instance 16 bits which depends on the size N. The capacity of memory that has longer bit length is reduced, therefore, this algorithm has great advantage that whole memory capacity is very small. Thus, the capacity of memory shown in FIGS. 15A to 15D is far smaller than the capacity of memory shown in FIGS. 10A to 10C, which is effective to simplify the whole apparatus for carrying out the radiographic image processing method.

The above two algorithms are of digital processing type in which the signals are processed in the digital form. It is, however, possible to integrate the analog signal in the primary scanning direction and stored the integrated value in memory and then conduct a numerical integration of the stored values in the sub-scanning direction to obtain the unsharp mask density Dus. In this case, since the analog value is integrated for every picture element, N analog integration circuits are required. The number of the analog integration circuits, however, can be reduced to only one by use of the following method.

That is, the analog output Dorg of the scanning point is divided into two outputs one of which is delayed by a delay circuit. The delayed signal and the other signal are fed to a differential signal operation circuit which gives an output representing the difference between the two input densities (Dorg-TDorg). The delayed density TDorg is a density delayed by a delay time (T) which is represented by the product of a scanning time ($\tau$) of one picture element and the number of the picture elements (N) in the unsharp mask counted in the primary scanning direction, i.e., $T = \tau \times N$. The output of the differential signal operation circuit is integrated to obtain the total sum of the Dorg by the formula $$\int_{-\infty}^{t} (Dorg - TDorg) = \quad (19)$$

$$\int_{-\infty}^{t} Dorg - \int_{-\infty}^{t-N \cdot \tau} Dorg = \int_{t-N \cdot \tau}^{t} Dorg$$

The integrated value corresponds to the value $C_{I,J}$ shown in FIGS. 9 and 10 which is added in the sub-scanning direction by a digital operation to obtain the value $T_{I,J}$. Then, by use of the value $T_{I,J}$, the unsharp mask Dus is obtained as mentioned hereinbefore. This is also a method which is capable of calculating the desired value (Dus) at a high speed and easily, that is a preferred method as an analog type operation.

Further, the unsharp mask Dus(IJ) is a value obtained from the densities $D_{ij}$ within the mask having a scanning point (ij) at its center and covering the scanning points within an area of $$\frac{N_1 - 1}{2} < i < N_x - \frac{N_1 - 1}{2} \quad (20a)$$

$$\frac{N_2 - 1}{2} < j < N_y - \frac{N_2 - 1}{2} \quad (20b)$$

where $N_x$ is the number of picture elements in the primary scanning direction and $N_y$ is the number of picture elements in the sub-scanning direction. Therefore, it is impossible to obtain the unsharp mask density of a scanning point at the edge of the image since some of the densities around the scanning point at the edge of the image are not defined.

In order to obtain the unsharp mask density Dus for the scanning point at the edge of the image, it is the simple and advantageous method to memorize the densities of the outermost picture elements (i.e. picture elements at the edge of the image) and use the memorized densities for the imaginary picture elements around the image assuming that the density of the outermost picture elements is the same for the imaginary picture elements around the image. Or, it is possible to assume that the imaginary picture elements around the image are imagined to be black or white, or to have an intermediate value between black and white.

The present invention is not limited to the above embodiments but may be embodied in a various variations.

The read-out of the image in the radiograph can be conducted by use of a rotating drum on which the radiograph is mounted or by use of a flat support movable for scanning on which the radiograph is mounted. The radiograph may be also scanned optically by the light beam scanning. Or, the read-out may be conducted by use of a beam scanning system like a flying spot scanner.

Further, though in the above embodiment the digital output of the A/D converter 6 is once memorized on a magnetic tape and the aforesaid operation is conducted based on the memorized output, it is possible to process the signal on real time and directly send the processed signal to the reproduction station. Further, the operation of the unsharp mask signal may be conducted off line after recording the necessary information on a magnetic tape or on line with the information memorized temporarily in core memory.

In the above embodiments, the reproduced image subjected to the image processing is finally recorded on a recording medium or a copying film such as a silver halide photographic film. Other than the silver halide film, however, a diazo film or an electrophotographic recording material can also be used. It is further possible to display the reproduced image on a CRT (Cathode Ray Tube) instead of recording the image on a copying film. Then, it is possible to further record the image displayed on the CRT on a recording film by an optical recording means.

Further, in the above embodiments, an electric signal amplified non-linearly by amplifier 5 after detected by the photodetector 4 is often used as the original image density. The reason why such signal is used is that the signal subjected to the band compression and/or non-linear correction like logarithmic amplification is advantageous to the signal processing. It is, however, of course possible to directly use the output signal of the photodetector as Dorg without any processing. Further, theoretically, the calculation of the unsharp mask density should be based on the energy itself. According to the experiments, however, it has been proved that the mean value obtained based on the log-compressed value corresponding to the density not to the energy showed the same results in the viewpoint of diagnostic efficiency and accuracy. This is practically very convenient and advantageous in conducting the operation. The present invention is not limited to the above embodiments but may be embodied in a various variations.

Now the present invention will be further described with reference to several examples thereof.

EXAMPLE I

More than 100 samples of typical radiographs of various portions of a human body were examined both in the form of the original radiograph and in the form of the radiographic image recorded on a recording medium by way of the radiographic image processing method in accordance with this invention. Particularly, the diagnostic efficiency and accuracy were compared between those two types of images. For examining the various factors in this invention, the emphasis coefficient $\beta$ and the spatial frequency fc at which the modulation transfer function becomes 0.5 were variously changed. As the unsharp mask, a circular area in which the image densities were averaged by use of a Gaussian weighted means was employed.

The results were evaluated by four radiologists since it was impossible to evaluate the diagnostic efficiency and accuracy by the objective physical evaluation by use of sharpness, contrast and granularity.

The standard of evaluation was as follows.

+2: The diagnostic efficiency and accuracy were greatly enhanced and improved. For this instance, the diseased portions which were not recognized in the conventional radiograph have become recognizable, or the diseased portions which were very difficult to recognize in the original radiograph have become clearly recognizable.

+1: The diagnostic efficiency and accuracy were improved. For instance, the diseased portions which were difficult to recognize have become recognizable.

0: The diagnostic efficiency and accuracy were not so improved, though the image has become somewhat clearer. −1: The diagnostic efficiency and accuracy were lowered in some parts while they were improved in other parts.

−2: The diagnostic efficiency and accuracy were lowered with no parts where they were improved.

Figure 17A:
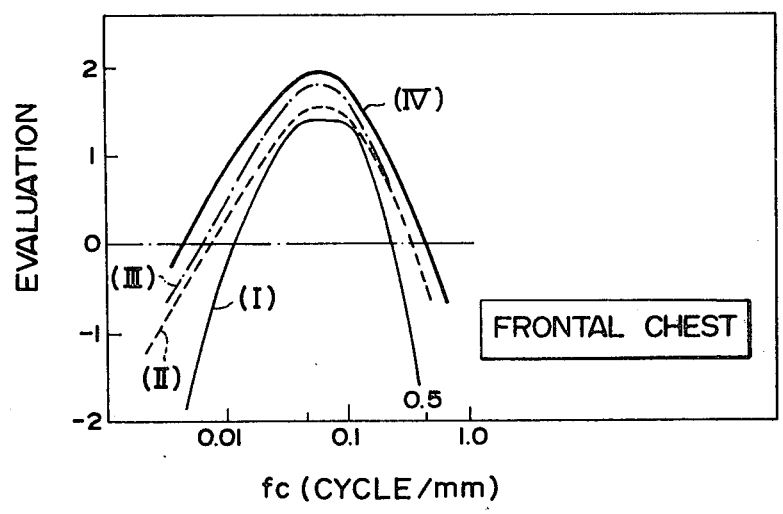
Figure 17B:
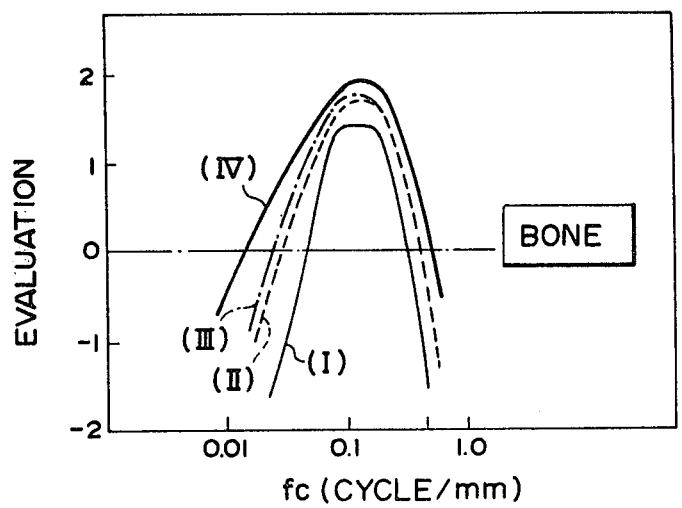

FIGS. 17A and 17B show the results of the relationship between the evaluation of the obtained image and the frequency fc at which the modulation transfer function became 0.5. FIG. 17A shows the examples of the frontal chest image, and FIG. 17B shows the examples of the bones. The thin solid line (I) shows the results where the emphasis coefficient $\beta$ was fixed at $\beta=3$. comparing FIG. 17A with 17B, the frequency range at which the evaluation is high is shifted to lower in the frontal chest examples as compared with the bone examples. Thus, it was found that the frequency components that should be emphasized depends upon the kind of the disease or portion of the human body. The broken line (II) shows the results were $\beta$ was changed according to the original image density continuously. In both examples, the range of high evaluation was expanded to both lower and higher frequency range. This is because, in FIG. 17A, saturated white areas (saturated to the fog level of the recording medium) at the heart and bone portion (including spine) disappeared and in FIG. 17B increase of the noise was prevented.

In the example of the chest, the emphasis coefficient $\beta$ was changed so that is was set 0 at the density $D_0$ where the integrated histogram became 10% (equivalent to the maximum density at the spine) and set 3 at the density $D_1$ where it became 50% (equivalent to the minimum density at the lung) and linearly changed therebetween.

The chain line (III) shows the results where the gradation process was added to the above process so that the contrast of the heart was lowered and the contrast of the lung was raised in FIG. 17A, and the contrast was raised as a whole to 1.5 times as high as the original contrast in FIG. 17B.

The thick solid line (IV) shows the results where the size of the image was reduced to $\frac{1}{2}$ to $\frac{1}{3}$ in addition to the above processes.

In the gradation process, the disease which shows a gentle change in contrast over a large area like a lung cancer or muscular tumor was made clearer. In the reduction of the image size, the super-low frequency components important for diagnosis were made closer to the optimum frequency of the modulation transfer function for the human visual sensitivity (1 to 2 cycle/mm), and the contrast appeared to have been enhanced and the diagnostic efficiency and accuracy were enhanced.

Further, when a smoothing process for making the modulation transfer function not less than 0.5 at the spatial frequency of 0.5 cycle/mm and not more than 0.5 at the spatial frequency of 5 cycle/mm was conducted in addition to the above-described emphasis of the super-low frequency components, the noise (granularity) on the image was removed and the diagnostic efficiency and accuracy was improved.

Figure 18:
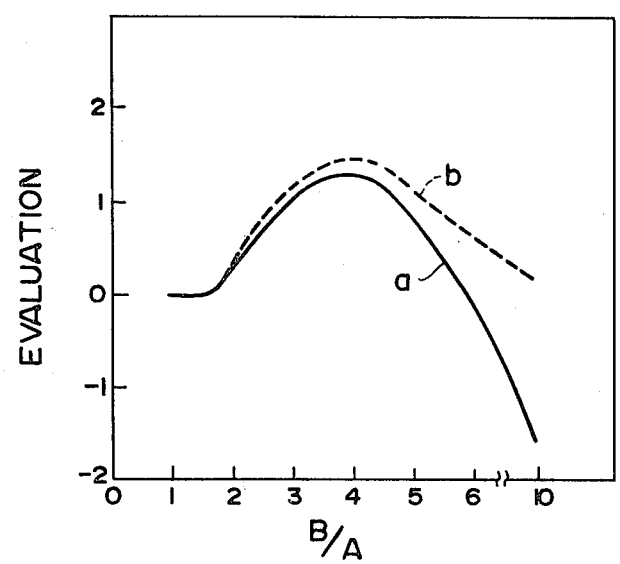
FIGS. 18 and 20 are graphs which show the relationship between the extent or degree of emphasis and the evaluation of the resulting images in diagnostic efficiency and accuracy.

FIG. 18 shows the relationship between the evaluation and the degree of emphasis represented by the ratio B/A in a chest. In this case, the frequency range to be emphasized is fixed at fc=0.1 and the emphasis coefficient $\beta$ was variously changed. The curve-a in FIG. 18 shows the results where $\beta$ was fixed regardless of the original image density, and the curve-b shows the results where $\beta$ was changed continuously with the original image density. The ratio B/A is the maximum ratio of B/A. In the curve-a where $\beta$ is constant, the evaluation falls below zero due to artifact-image when the ratio B/A becomes more than 6 or 7. In the curve-b where $\beta$ is changed, the artifact-image disappears and the evaluation is above zero over a wide range of $1.5 \leq B/A \leq 10$. As for the other examples, substantially the same results were observed.

Table 1 shows the range of fc where the evaluation was improved or above zero for other samples. The frequency fc is of the spatial frequency measured on the phosphor plate.

TABLE 1

| Portion of Sample | Frequency Range (fc:cycle/mm) |
|---|---|
| Frontal Chest | 0.01–0.2 |
| Lateral Chest | 0.01–0.05 |
| Bone (incl. mustle) | 0.05–0.5 |
| Mamma (calcification) | 0.1–0.5 |
| Mamma (Cancer) | 0.01–0.1 |
| Blood Vessel | 0.1–0.5 |
| Stomack | 0.1–0.5 |

As shown in the above table, the frequency range which is important for diagnosis was proved to be distributed in the very low frequency range around the range of $0.01 \leq fc \leq 0.5$ cycle/mm.

Further, it was confirmed that the diagnosis was further enhanced by the combination of the super-low frequency emphasis and other process like the variation of the emphasis coefficient $\beta$, gradation process, image size reduction and smoothing process in all the above types of portions or diseases.

EXAMPLE II 200 samples for the portions as shown in Table 2 were examined both in the form of the original radiograph and in the form of the radiographic image obtained by the present invention. Particularly, the diagnostic efficiency and accuracy were compared between those two types of images.

TABLE 2

Plain Image: Frontal Chest, Lateral Chest, Abdomen, Bone, Head, Mamma
Contrast Image: Stomack Double Contrast, Blood Vessel (Angiography), Veins, Lymphography
Tomographic Image: Chest, Abdomen In the process for obtaining the reproduction image, the emphasis coefficient $\beta$ was fixed at 3 and a rectangular area was used as the unsharp mask for obtaining a simple arithmetic mean of the image densities of the picture elements therein. The evaluation was performed at six different spatial frequency at which the modulation transfer function becomes 0.5 (fc). The results were evaluated by four radiologist, twelve clinical doctor, and four radiologic technologist. These specialists evaluated the resulting images by subjective evaluation. The standard of evaluation was the same as in Example I.

FIG. 19 shows the results of the evaluation by the 20 specialists for the 200 samples averaged into a simple curve in a graph of evaluation plotted against the spatial frequency fc at which the modulation transfer function becomes 0.5.

As shown in FIG. 19, the range of fc in which the diagnostic efficiency and accuracy was particularly enhanced was 0.02 to 0.15 cycle/mm. Further, by this examination, it was proved that the range of fc wherein the results of the process in accordance with this invention were recognized "improved" were not so different for different radiographic images though the value of fc at which the evaluation was the highest, i.e. the peak of evaluation was somewhat different depending upon the evaluating person, the evaluated portion (part of the human body) or disease, and the purpose of the examination for the radiation image, i.e. mass survey or examination.

EXAMPLE III

Typical 20 samples of the portions as shown in Table 2 were evaluated with fc fixed at 0.05 cycle/mm and B/A variously changed. By the same method as of Example II, the radiographic image in accordance with this invention was obtained and evaluated by 20 specialists as in Example II. The average values of the evaluation are shown in FIG. 20.

Figure 20:
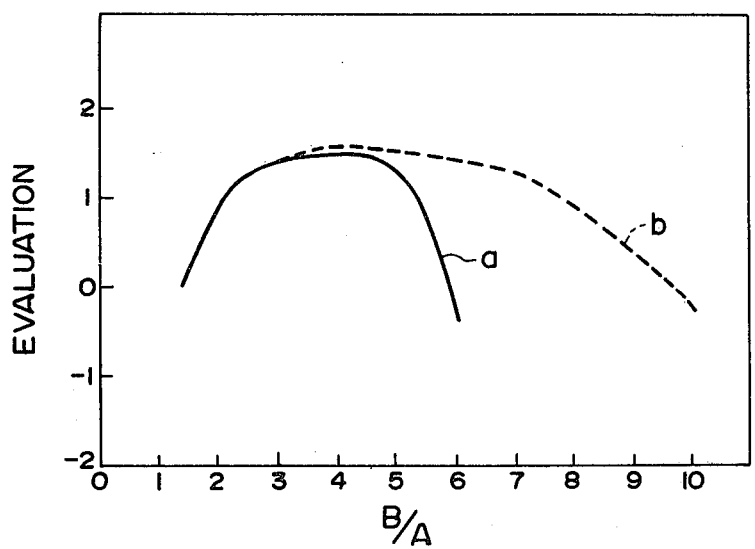

As shown in FIG. 20, when $\beta$ was fixed (curve-a) the diagnostic efficiency and accuracy was enhanced in the range of 1.5 to 6 B/A and particularly enhanced in the range of 2 to 5.5. When $\beta$ was charged (curve-b), the diagnostic efficiency and accuracy was enhanced in the range of 1.5 to 10 and particularly enhanced in the range of 2 to 8.

EXAMPLE IV

Typical 100 samples of the portions as shown in Table 3 below were evaluated with $\beta$ changed according to the original image density or the unsharp mask density as shown in FIGS. 3A to 3D. As the unsharp mask was used a simple arithmetic mean of image densities within a rectangular area. As the frequency fc the optimum frequency for every samples was selected within a range of 0.01 to 0.5 cycle/mm by try and error. The evaluation of the resulting images was made by the same method as employed in Example I.

The results of the evaluation is shown in Table 3. In Table 3, A, B, C, D mean the results of the evaluation of the image in case that $\beta$ was changed in the form of FIGS. 3A, 3B, 3C and 3D, respectively. When the evaluation in case that $\beta$ was changed as shown in FIG. 3B was better than the evaluation in case that $\beta$ was changed as shown in FIG. 3C, the indication of the evaluation result is shown as C<B, for example.

As shown in Table 3, it was proved that the evaluation was higher in case that $\beta$ was changed as shown in FIGS. 3B, 3C or 3D than the evaluation in case that $\beta$ was fixed as shown in FIG. 3A.

TABLE 3

| Sample | Rank of Evaluation | Evaluation (DE: diagnostic efficiency and accuracy) | |
| --- | --- | --- | --- |
| Head | A<C<B | B: | DE of brain tumor and mustle of face was improved. |
| Plain Roentgenogram Chest | A<B<C | C: | DE of cancer overlapped with spine or heart was improved. |
| | A<C<B | B: | DE of cancer in the lung field portion and pneumonia was improved. |
| Chest Tomography | A<B<C | C: | DE of cancer at mediastinum and brinchitis was improved. |
| | A<C<B | B: | DE of cancer in the lung field portion was improved. |
| Bone, Mustle | A<B<C | C: | DE of fracture and epiphyseal line was improved. |
| | A<C<B | B: | DE of mustle tumor was improved. |
| Mamma | A<B<C | C: | DE of cancer and calcification of mammary glandular tissue was improved. |
| | A<C<B | B: | DE of abnormality of fat and skin was improved. |
| Blood Vessel (Angiography) | A<B<C | C: | Fine details of blood vessels were clearly observed. |
| Lymphography | A<B<C | C: | Lymphatic gland and node were clearly observed and well reflected anatomical structure. |
| Stomack Double Contrast | A<B<D | D: | DE of stomack details was improved. |
| Cholecystography | A<B<D | D: | DE of common bile duct and gallstone was improved. |
| Liver | A<B<D | D: | The internal structure of liver was clearly observed. |

EXAMPLE V

Four samples for each of the chest and bone were evaluated for comparing the ideal unsharp mask with the unsharp mask having a rectangular shape.

The sampling of the original radiographic image was conducted at the rate of 10 pixel/mm and a circular mask having a diameter of 6 mm was used to calculate the ideal unsharp mask density by weighting the original image density with a weighting coefficient having a Gaussian distribution over the mask. Another unsharp mask was obtained by scanning the original radiograph in the primary direction at a speed of $20 \times 10^3$ pixel/sec and having the output of the image density pass through a low-pass filter having a cut-off frequency of $0.2 \times 10^3$ cycle/sec. The low-pass filtered densities were simply added together for the sub-scanning direction by a digital calculation (i.e. simple arithmetic mean). The emphasis coefficient $\beta$ was set at 2.

The evaluation of the results was made by the same method as employed in Example I by four radiologists. The results showed that there was no difference between the above two kinds of unsharp mask in their diagnostic efficiency and accuracy.

EXAMPLE VI

The emphasis coefficient $\beta$ was changed to 4 and all the other conditions were the same as in Example V. The results obtained were substantially the same as those of Example V.

We claim:

1. A method of copying a radiographic image in a radiographic image copying system comprising the steps of: scanning an original radiograph with a light beam; reading out and converting radiographic image information recorded on said original radiograph into an original image density; processing said original image density to produce an output density in accordance with $$D' = Dorg + \beta(Dorg - Dus)$$

where Dorg is said original image density, $\beta$ is an emphasis coefficient, Dus is an unsharp mask density corresponding to a predetermined super-low spatial frequency at every scanning point, and D' is said output density whereby a frequency component above said predetermined super-low spatial frequency is emphasized; and displaying a visual image in response to said output density.

2. A method of copying a radiographic image in a radiographic image copying system as defined in claim 1 wherein said unsharp mask density corresponds to a modulation transfer function which is not less than 0.5 at a spatial frequency of 0.01 cycle/mm and not more than 0.5 at a spatial frequency of 0.5 cycle/mm.

3. A method of copying a radiographic image in a radiographic image copying system as defined in claim 1 wherein said unsharp mask density corresponds to a modulation transfer function which is not less than 0.5 at a spatial frequency of 0.02 cycle/mm and not more than 0.5 at a spatial frequency of 0.15 cycle/mm.

4. A method of copying a radiographic image as defined in any one of claims 1 to 3 wherein said emphasis coefficient $\beta$ is varied in response to one of said original image density and said unsharp mask density.

5. A method of copying a radiographic image as defined in any one of claims 1 to 3 wherein the maximum value of a modulation transfer function of a finally recorded radiation image is 1.5 to 10 times as large as a limit value of said modulation transfer function where said spatial frequency is infinitely close to zero and wherein said emphasis coefficient $\beta$ is varied in response to one of said original image density and said unsharp mask density.

6. A method of copying a radiographic image as defined in claim 1 wherein said emphasis coefficient $\beta$ is a constant value.

7. A method of copying a radiographic image as defined in claim 6 wherein the maximum value of a modulation transfer function of a finally reproduced image is 1.5 to 6 times as large as a limit value of said modulation tranfer function where said spatial frequency is infinitely close to zero.

8. A method of copying a radiographic image as defined in claim 1 further comprising a step of smoothing said output density, wherein a modulation transfer function of a finally recorded radiographic image is not less than 0.5 at a spatial frequency of 0.5 cycle/mm and not more than 0.5 at a spatial frequency of 5 cycle/mm.

9. A method of copying a radiographic image as defined in claim 8 wherein said unsharp mask density Dus is obtained by low-pass filtering said original image density Dorg in analog form in a primary scanning direction on said original radiograph and calculating an arithmetic mean of low-pass filtered densities in a sub-scanning direction on said original radiograph.

10. A method of copying a radiographic image as defined in claim 9 wherein said arithmetic mean is a simple arithmetic mean.

11. A method of copying a radiographic image as defined in claim 1 wherein said unsharp mask density Dus is obtained by calculating a simple arithmetic mean of original image densities Dorg of a plurality of scanning points within a rectangular area enclosed by two parallel lines in a direction of primary scanning of said light beam on said original radiograph and two parallel lines in a direction of sub-scanning of said light beam on said original radiograph.

12. A method of copying a radiographic image as defined in claim 1 wherein a finally reproduced image is reduced in size as compared with a corresponding image on said original radiograph.

13. An apparatus for copying a radiographic image in a radiographic image copying system comprising a light source for emitting a light beam; means for scanning said beam upon an original radiograph; a photodetector for detecting transmitted light from the scanned original radiograph and converting said light to an original image density, and an operation unit means for processing said original image density, said operation unit means processing said original image density in accordance with $$D' = Dorg + \beta(Dorg - Dus)$$

to produce an output density where Dorg is said original image density, $\beta$ is an emphasis coefficient, Dus is an unsharp mask density corresponding to a super-low spatial frequency at every detecting point and D' is said output density; and means for recording a visual image on a recording material in response to said output density.

14. An apparatus for copying a radiographic image as defined in claim 13 wherein said operation unit means comprises a low-pass filter for low-pass filtering in a primary scanning direction on said original radiograph said original image density, an A/D converter for A/D converting an output of said low-pass filter, and a digital calculating means for calculating an arithmetic mean of an output of said A/D converter in a subscanning direction of said original radiograph, thereby obtaining said unsharp mask density Dus corresponding to said super-low frequency at every detecting point.

15. An apparatus for copying a radiographic image as defined in claim 13 wherein said operation unit means comprises circuit means for calculating a simple arithmetic mean of said original image densities within a rectangular area enclosed by two parallel lines in a primary scanning direction of said beam on said original radiograph and two parallel lines in a sub-scanning direction of said beam on said original radiograph to obtain said unsharp mask density Dus.

16. An apparatus for copying a radiographic image as defined in any one of claims 13 to 15 wherein said operation unit means comprises means for determining said emphasis coefficient $\beta$ in response to one of said original image density Dorg and unsharp mask density Dus.

* * * * *